United States Patent [19]

Johnston

[11] Patent Number: 5,127,496
[45] Date of Patent: Jul. 7, 1992

[54] BRAKE LOCKING AND RELEASE SYSTEM

[75] Inventor: James E. Johnston, Geneseo, Ill.

[73] Assignee: Caterpillar Inc., Peoria, Ill.

[21] Appl. No.: 640,773

[22] Filed: Jan. 14, 1991

[51] Int. Cl.$^5$ ............................................. F16D 69/00
[52] U.S. Cl. ..................................... 188/265; 74/529; 74/540
[58] Field of Search .................. 188/265; 74/529, 540

[56] References Cited

U.S. PATENT DOCUMENTS

| | | | |
|---|---|---|---|
| 2,854,858 | 10/1958 | Butterfield et al. | 74/512 |
| 2,881,872 | 4/1959 | Risk | 188/106 |
| 3,194,085 | 7/1965 | Kirk | 74/540 |
| 3,364,784 | 1/1968 | Mellen | 74/529 |
| 3,861,237 | 1/1975 | Mounts | 74/516 |
| 3,929,033 | 12/1975 | Marx | 188/265 X |
| 4,421,214 | 12/1983 | Sellmeyer | 74/529 X |
| 4,441,380 | 4/1984 | Kawaguchi et al. | 74/529 X |
| 4,604,913 | 8/1986 | Kyonomine | 74/540 |
| 4,612,823 | 9/1986 | De Leeuw et al. | 74/540 X |
| 4,949,592 | 8/1990 | Yamazaki et al. | 74/529 X |

FOREIGN PATENT DOCUMENTS

| | | |
|---|---|---|
| 276478 | 7/1926 | United Kingdom . |
| 354477 | 6/1930 | United Kingdom . |
| 776557 | 9/1954 | United Kingdom . |
| 1233157 | 7/1968 | United Kingdom . |

Primary Examiner—Robert J. Oberleitner
Assistant Examiner—Lee W. Young
Attorney, Agent, or Firm—J. Wesley Blumenshine

[57] ABSTRACT

This invention relates to systems for locking a brake in a brake actuated position. The invention is similar to other such systems in that the system comprises a brake, a pedal lever having a ratcheted edge and being connected via a linkage to the brake, a locking member such as a pawl with a tooth for engaging the ratcheted edge of the pedal lever in a brake actuated position, and a locking lever connected to the pawl for displacing the pawl between a first position at which the pawl is remote from the ratcheted edge of the pedal lever and a second position at which the pawl interfaces with the ratcheted edge of the pedal lever, the locking lever being hand manipulated by a handle connected to the locking lever via a linkage. However, this invention is an improvement over such other systems in that an elastic member is connected between the pawl and the locking lever so that when the locking lever is moved from its first position to its second position, and any frictional forces between the pawl and ratcheted edge are relieved, the pawl will return automatically to its disengaged position.

8 Claims, 7 Drawing Sheets

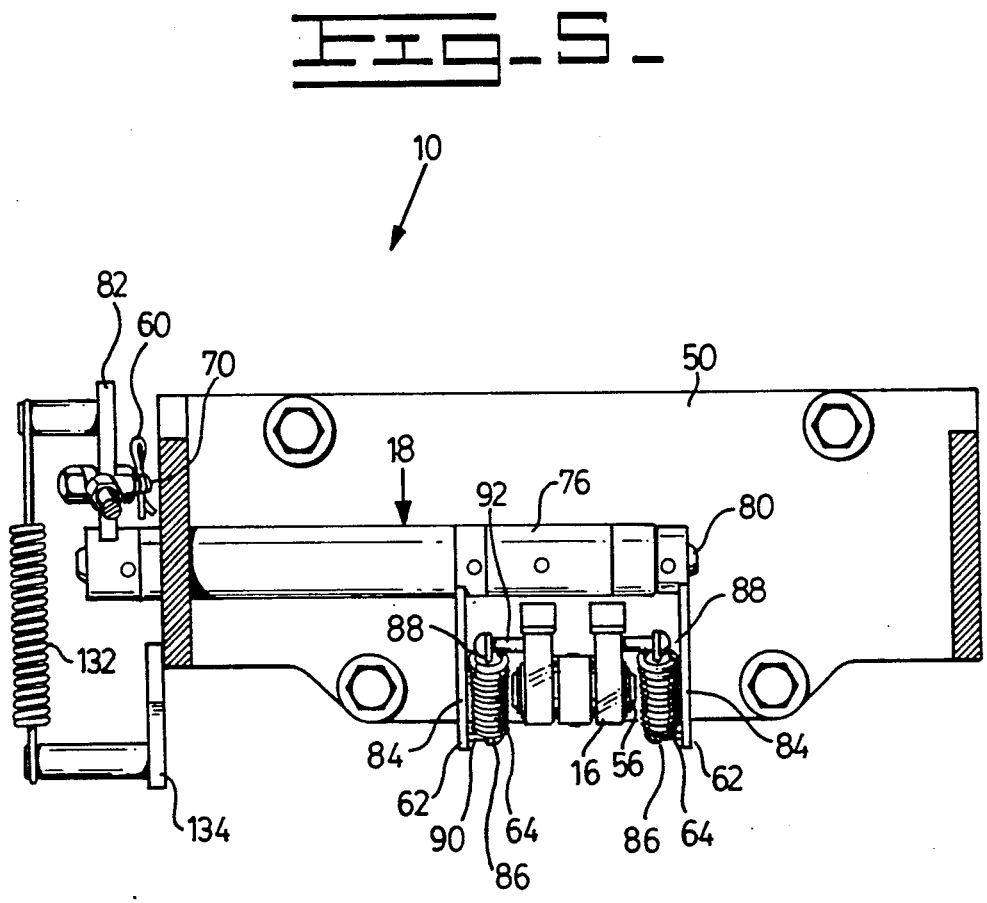

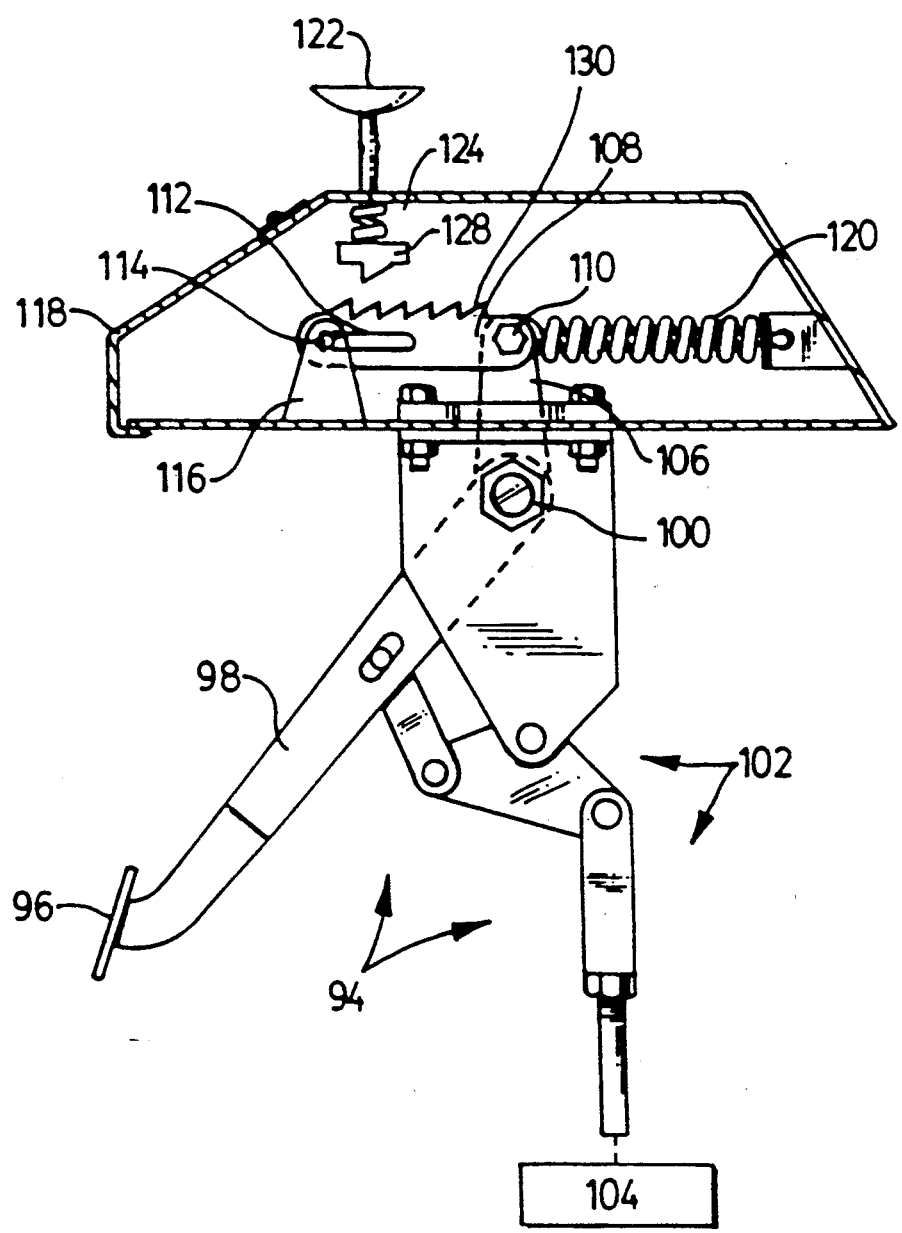

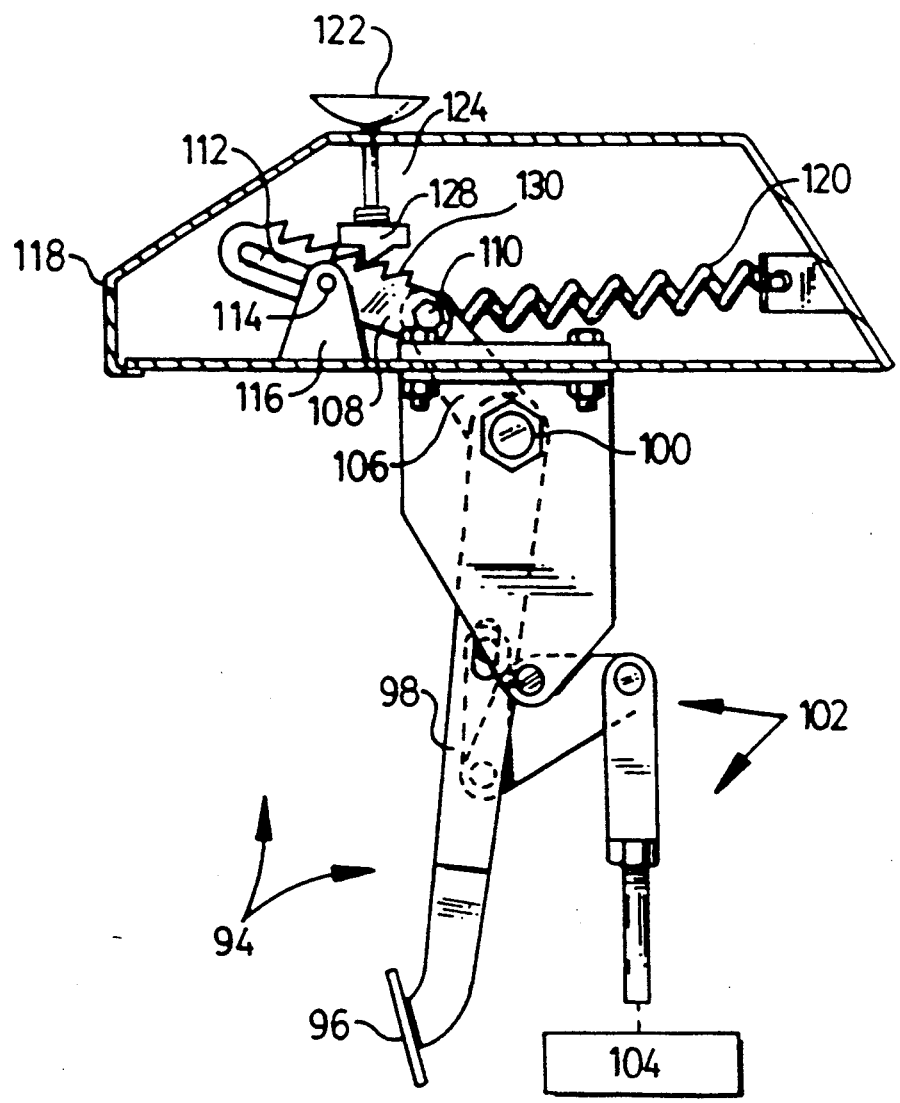

BRAKE LOCKING AND RELEASE SYSTEM

DESCRIPTION

1. Technical Field

This invention relates to systems for locking a brake in a brake actuated position. The invention is similar to other such systems in that it comprises a brake, a brake actuating means, a locking member that interfaces with the brake actuating means to lock the brake in a brake actuated position, and a locking member actuating means. However, this invention is an improvement over such other systems in that the locking member is connected to an elastic member so that when the locking member actuating means is moved from its locked to its unlocked position and any forces between the locking member and brake actuating means are relieved, the locking member will automatically return to its unlocked position.

2. Background Art

Systems for locking a brake in an actuated position are many and varied. A subset of such systems are those in which the brake is locked in an actuated position by interfacing a locking member with a member of the brake actuating means, or with another member connected to a member of the brake actuating means, to lock the brake actuating means and consequently the brake in a brake actuated position. Such systems are disclosed in U.S. Pat. No. 2,881,872, entitled "Emergency and Parking Brake for Tractors" which issued to Risk on Apr. 14, 1959; U.S. Pat. No. 3,194,085, entitled "Foot-Operated, Hand-Released Parking Brake" which issued to Kirk on Jul. 13, 1965; and U.S. Pat. No. 3,861,237 entitled "Parking Brake Actuating Mechanism" which issued to Mounts on Jan. 21, 1975.

In such systems, the operator of the vehicle actuates the brakes with a brake actuating means, which is typically a foot-pedal actuated lever and linkage arrangement. At a point where acceptable brake force is being exerted, the operator, through a locking member actuating means, which is typically a hand operated linkage, manipulates the locking member into a locking interface with a member of the brake actuating means, or with another member connected to the brake actuating means. This prevents the brake actuating means from retracting and thus locks the brakes in an actuated position. When the operator is ready to release the brake, he must manipulate the locking member out of the interface by use of the same linkage.

Because the brake actuating means is usually predisposed to a brake-off position, before unlocking the brakes, the operator often has to move the brake actuating means to a slightly greater brake actuated position to relieve the frictional force between the brake actuating means and the loeking member, thereby allowing the locking member to be manipulated out of the interface. Such a task sounds easier than it really is, especially for heavy duty construction equipment where tremendous force is exerted on the brakes, subsequently on the brake actuating means and subsequently on the locking member.

The problem can manifest itself in a brake arrangement having one brake actuating means and one locking member, but becomes especially troublesome in a brake arrangement having two brake actuating means and two locking members, but only one locking member actuating linkage. In such an arrangement, the operator often applies the brakes separately so that the brake actuating means are in different positions and different braking forces are being applied to each brake. In order to remove the two locking members from their interfaces with the two brake actuating means, a similar degree of additional force must be applied simultaneously to each brake actuating means in order to relieve the frictional force between the two brake actuating means and the two locking members so the locking members can be manipulated out of the interfaces. If too much pressure is applied to one or both of the brake actuating means, that brake actuating means may be locked in a new brake actuated position or, if not enough pressure is applied, not enough frictional force may be relieved from the respective locking member to allow it to be manipulated out of its interface.

Another major problem with such arrangements is that releasing the brakes requires a coordinated foot and hand action, as follows: slight additional force must be applied to the brake actuating means, usually by foot, to relieve the force between the brake actuating means and the locking member(s) while, simultaneously, the locking member(s) must be manipulated, usually by hand manipulation of the locking member actuating means, out of the interface. Some of such systems have been so difficult to release, that vehicles in the field have had to be disassembled in order to unlock the brake.

The present invention is intended to overcome the aforementioned problems and provide a reliable brake locking and release system.

DISCLOSURE OF THE INVENTION

This invention relates to a brake locking and release system. Systems of the present invention include a brake, a brake actuating means, a locking member and a locking member actuating means.

The brake actuating means has a brake-off position and at least one brake actuated position. The brake actuating means is predisposed to the brake-off position.

The locking member has a first position at which the locking member is remote from the brake actuating means and a second position at which the locking member interfaces with the brake actuating means. When the locking member is at the first position, in the absence of any other external forces, the brake actuating means is free to return to the brake-off position. When the locking member is at the second position, the locking member locks the brake actuating means at a brake actuated position and prevents the brake actuating means from returning to the brake-off position.

The locking member actuating means has an elastic member connected to the locking member. The locking member actuating means has a first position and a second position. At the second position of the locking member actuating means the locking member is at the locking member's second position and when the locking member actuating means is moved from the locking member actuating means, second position to the locking member actuating means, first position, the elastic member exerts a force on the locking member urging the locking member towards the locking member's first position at least until the locking member returns to the locking member's first position.

In another aspect of the present invention, the locking member actuating means includes a locking lever. The elastic member has a first end connected to the locking lever and a second end connected to the locking member. At the second position of the locking member actuating means the elastic member exerts a force on the locking member to hold the locking member in the locking member's second position.

In another aspect of the present invention, the brake actuating means includes a first lever and a linkage having a first end connected to the first lever and a second end connected to the brake. Movement of the first lever is translated through the linkage to the brake, creating a braking force.

In yet another aspect of the present invention, the first lever has a ratcheted edge and the second lever and locking member are pivotal between their respective first and second positions. At the second position of the locking member, the locking member interfaces with the ratcheted edge of the first lever and holds the brake actuating means and consequently the brake in an actuated position.

BRIEF DESCRIPTION OF THE DRAWINGS

FIG. 5 is a diagrammatical front view of a brake locking and release system of the present invention;

FIG. 6 is a diagrammatical right side view of another embodiment of a brake locking and release system of the present invention in a brake-off position; and FIG. 7 is a diagrammatical right side view of the brake locking and release system shown in FIG. 6 in a brake actuated and locked position.

BEST MODE FOR CARRYING OUT THE INVENTION

Figure 1:
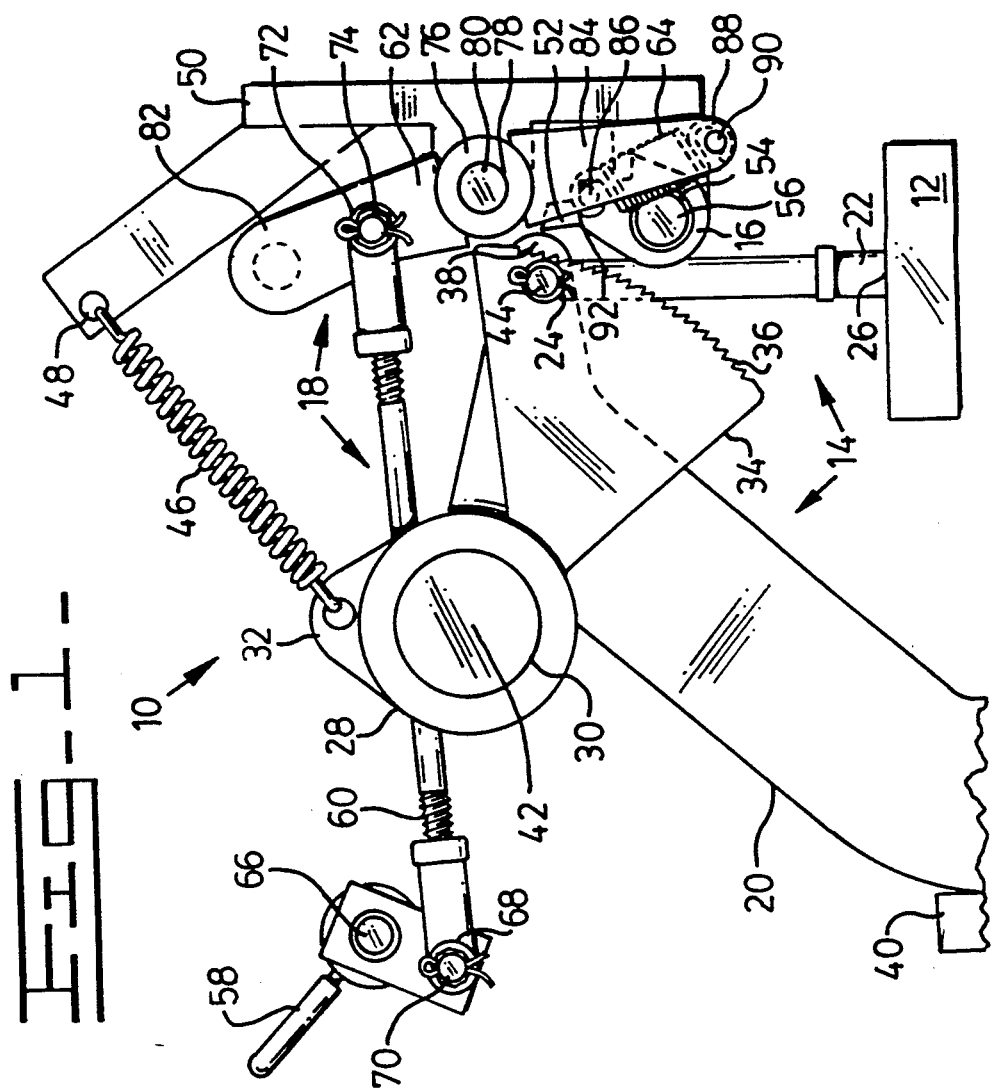
FIG. 1 is a diagrammatical right side view of a brake locking and release system of the present invention in a brake-off position.

Referring to FIG. 1, a preferred embodiment of a brake locking and release system 10 of the present invention is shown. The system includes a brake 12, a brake actuating means 14, a locking member 16 and a locking member actuating means 18.

The brake actuating means 14 is comprised of a pedal actuated first lever 20 and a brake actuating linkage 22 having a first end 24 connected to the first lever 20 and a second end 26 connected to the brake 12.

The first lever 20 has a boss 28 having a shaft 30 therethrough, an ear 32 having a hole therein, a tongue 34 having a ratcheted edge 36, a nose 38 having a hole therein, and a pedal 40. The first lever 20 is trifurcated, meaning the pedal 40, tongue 34 and nose 38 are spaced apart but are all fixedly joined to the boss 28 and therefore move in conjunction with one another. The first lever 20 is mounted on a first pivot pin 42 and is pivotable about the first pivot pin 42 between the brake-off position shown in FIG. 1 and the brake actuated position(s) shown in FIG. 2.

Figure 2:
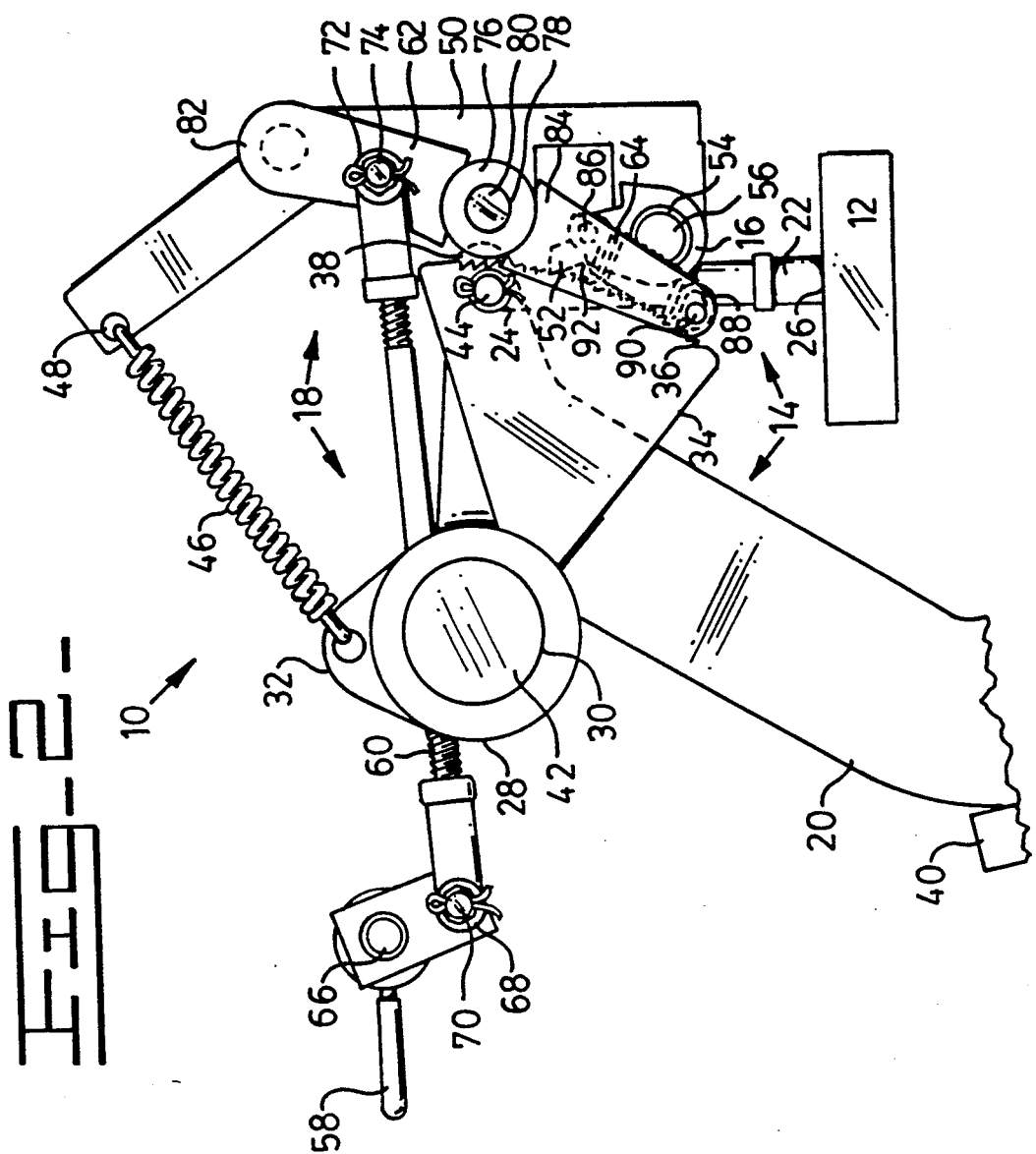
FIG. 2 is a diagrammatical right side view of the brake locking and release system shown in FIG. 1 in a brake actuated and locked position.

The brake actuating linkage 22 is pivotally connected at the hole in the nose 38 of the first lever 20 by a first cotter pin fastener 44, thus, as the first lever 20 is pivoted in a counter-clockwise direction by pressure from the foot-operated pedal 40, the brake actuating linkage 22 moves vertically upwards from the brake-off position shown in FIG. 1 to the brake actuated position shown in FIG. 2. This movement of the brake actuating linkage 22 causes actuation of the brake 12. Because the first pivot pin 42 is fixed, the first lever 20 pivots through a predetermined path. As the first lever 20 is moved from the brake-off position to subsequent brake actuated positions, a progressively increasing braking force is applied by the brake 12.

A first tension coil spring 46 is connected between the hole in the ear 32 of the first lever 20 and the top hole 48 in the mounting bracket 50 so that as foot pressure is relieved from the first lever 20, the tensile force of the first tension coil spring 46 will urge the first lever 20 to rotate clockwise along the predetermined path to the brake-off position, thus decreasing the braking force until the brake 12 is completely off. Thus, it is seen, the first tension coil spring 46 predisposes the first lever 20 and subsequently the brake actuating linkage 22 and brake 12 to the brake-off position. In other words, in the absence of any external forces, the brake actuating means 14 and brake 12 will be in a brake-off position.

In the preferred embodiment, the locking member 16 is a pawl having a tooth. The locking member 16 has a shaft into which is pressed a bearing 54 which is mounted on a second pivot pin 56 so that the locking member 16 is pivotable between the first position shown in FIG. 1, at which the locking member 16 is remote from the ratcheted edge 36 of the tongue 34 of the first lever 20, and the second position shown in FIG. 2, at which the locking member 16 interfaces with the ratcheted edge 36 of the tongue 34 of the first lever 20. The locking member 16 is pivoted between the first and second positions by the locking member actuating means 18.

The locking member actuating means 18 includes a handle 58, a locking member actuating linkage 60, a locking lever 62, and an elastic member 64.

The handle 58 is pivotable about a third pivot pin 66 between the first position shown in FIG. 1 and the second position shown in FIG. 2. The locking member actuating linkage 60 has a first end 68 connected by a second cotter pin fastener 70 to the handle 58 and a second end 72 connected by a third cotter pin fastener 74 to the locking lever 62. The locking lever 62 has a boss 76 having a shaft 78 therethrough for mounting on a fourth pivot pin 80 such that the locking lever 62 is pivotable between the first position shown in FIG. 1 and the second position shown in FIG. 2. In the preferred embodiment, the locking lever 62 is bifurcated, meaning the top arm 82 and bottom arm 84 of the locking lever 62 are both fixedly connected to the boss 76 of the locking lever 62 but are laterally spaced apart. The elastic member 64, which in the preferred embodiment is an over-center tension coil spring, has a first end 88 connected to the locking lever 62 by being wrapped around a rod 90 fixed to the locking lever 62 and a second end 86 connected to the locking member 16 by being wrapped around a rod 92 fixed to the locking member 16.

The pivot pins are all held by one or more fixed mounting brackets (not all shown) and, thus, other than pivotal movement and movement caused by pivotal movement, the brake locking and release system 10 remains in a fixed position.

Figure 4:
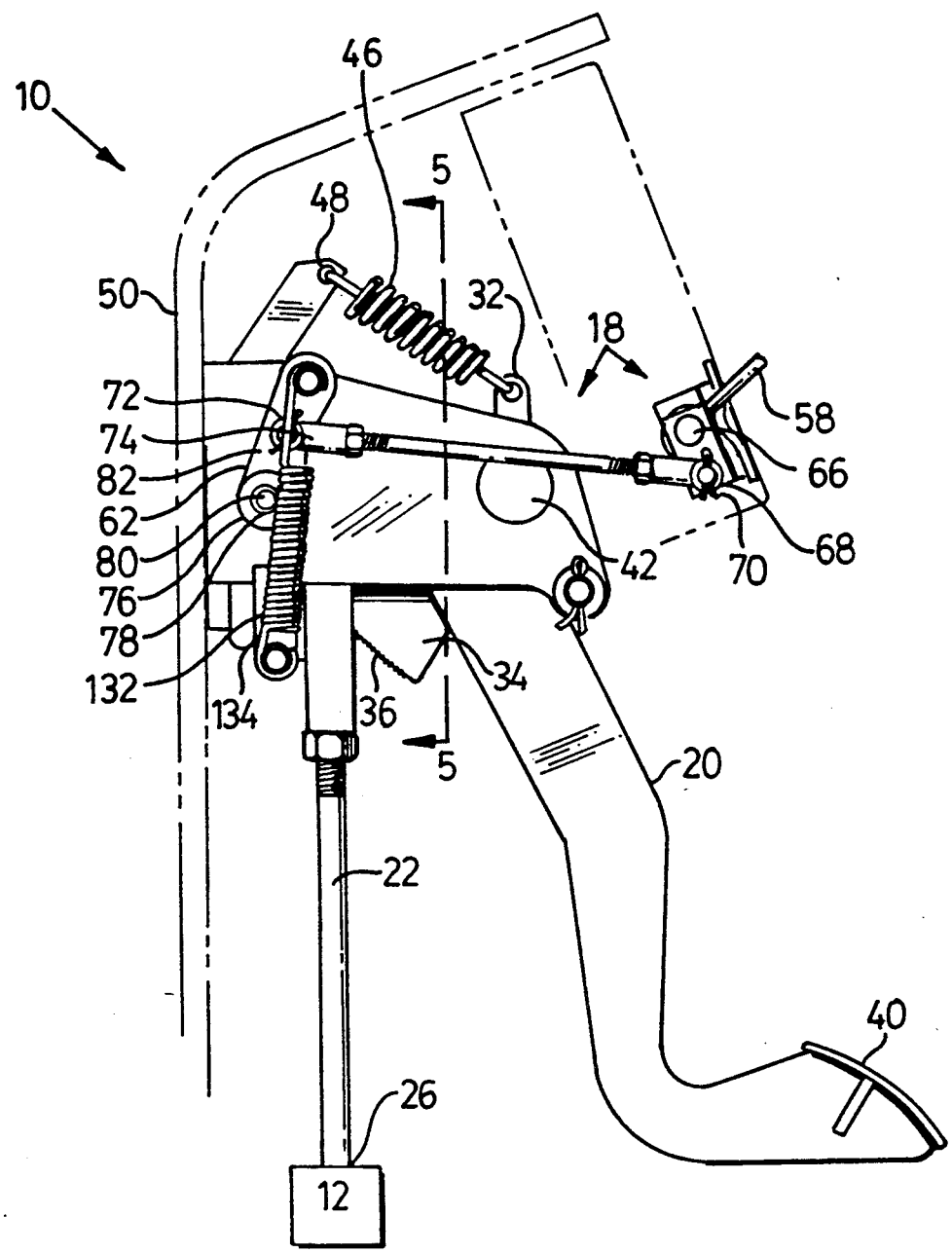
FIG. 4 is a diagrammatical left side view of a brake locking and release system of the present invention.

Now looking at FIGS. 4 and 5, in this preferred embodiment, a helper tension coil spring 132 is connected between a fixed bracket 134 and the top arm 82 of the locking lever 62. The helper spring 132 functions in the same over-center manner as the elastic member 64, such that the helper spring 132 will help keep the locking lever 62 in whatever position the locking lever 62 is supposed to be in, such that the locking lever 62 and consequently the locking member 16 will not be as sensitive to jarring and vibratory movements of the vehicle.

FIG. 6 shows an alternative preferred embodiment of the present invention. In this embodiment, the brake actuating means 94 includes a foot-pedal 96 actuated first lever 98 pivotal about a first pivot pin 100 between the brake-off position shown in FIG. 6 and the brake actuated position shown in FIG. 7, a brake actuating linkage 102 connected between the first lever 98 and the brake 104, an extension lever 106 fixedly connected to the first lever 98 to form a bellcrank therewith, and a slide bar 108 pivotally connected to the upper end of the extension lever 106 by a first cotter pin fastener 110.

The slide bar 108 has an elongated slot 112 formed therein which slidably engages a stationery pin 114 secured to an upstanding bracket 116 secured to the dashboard 118. A first tension coil spring 120 is connected between the dashboard 118 and the slide bar 108 to retract the slide bar 108 thus predisposing the slide bar 108 to its brake-off FIG. 6 position. Such retraction in turn automatically functions to move the brake actuating linkage 102 to its FIG. 6 brake-off position.

A handle 122 projects through the dashboard 118 and is connected to an elastic member 124, which in this embodiment is a second tension coil spring, which in turn is connected to a locking member 128.

Industrial Applicability

As stated previously, FIG. 1 shows the brake locking and release system 10 in the brake-off position. Now looking at FIG. 2, the brake locking and release system 10 is shown in a brake actuated and locked position. From FIG. 1 to FIG. 2, the operator has, with the pressure of his foot, manipulated the first lever 20 and subsequently the rest of the brake actuating means 14 to a brake actuated position. The further the operator pushes in on the first lever 20, the greater the braking force. At some point, the operator has switched the handle 58 of the locking member actuating means 18 from the first position to the second position. This in turn has caused the rest of the locking member actuating means 18 and locking member 16 to move from the first to the second position. The operator could have moved the locking member 16 into the second position prior to applying any pressure to the first lever 20, in which case the locking member 16 would simply ride along the ratcheted edge 36 of the tongue 34 of the first lever 20 until the operator relieved the pressure of his foot, at which time, the interface of the locking member 16 and ratcheted edge 36 would lock the brake actuating means 14 in a brake actuated position. Once the locking member 16 is in locking interface, because of the shape of the ratcheted edge 36, the operator is still able to apply additional pressure to the first lever 20 to increase the braking force and the locking member 16 simply rides along the ratcheted edge 36 until the foot pressure of the operator is relieved, at which time the locking member 16 is in another locking interface with the first lever 20, thus maintaining that braking force.

The locking member 16 is manipulated between the first and second positions by the action of the elastic member 64. By nature, the elastic member 64 seeks an equilibrium, no-force state, which is its unstretched condition. In FIG. 1, the locking lever 62 is in the first position and the lower end of the bottom arm 84 of the locking lever 62 is in a backward position. In this position, the elastic member 64 holds the locking member 16 remote from the ratcheted edge 36 of the first lever 20 and any movement of the locking member 16 towards the first lever 20 is resisted by the elastic member 64. In FIG. 2, the locking lever 62 has been moved to the second position and the lower end of the bottom arm 84 is in a forward position. As the lower end of the bottom arm 84 of the locking lever 62 was manipulated from the backward position to the forward position, the elastic member 64 was stretched. Once the elastic member 64 crossed the centerline of the second pivot pin 56, the retractive force exerted by the elastic member 64 forced the locking member 16 to move forward into interface with the ratcheted edge 36 of the tongue 34 of the first lever 20, and hold it there.

Figure 3:
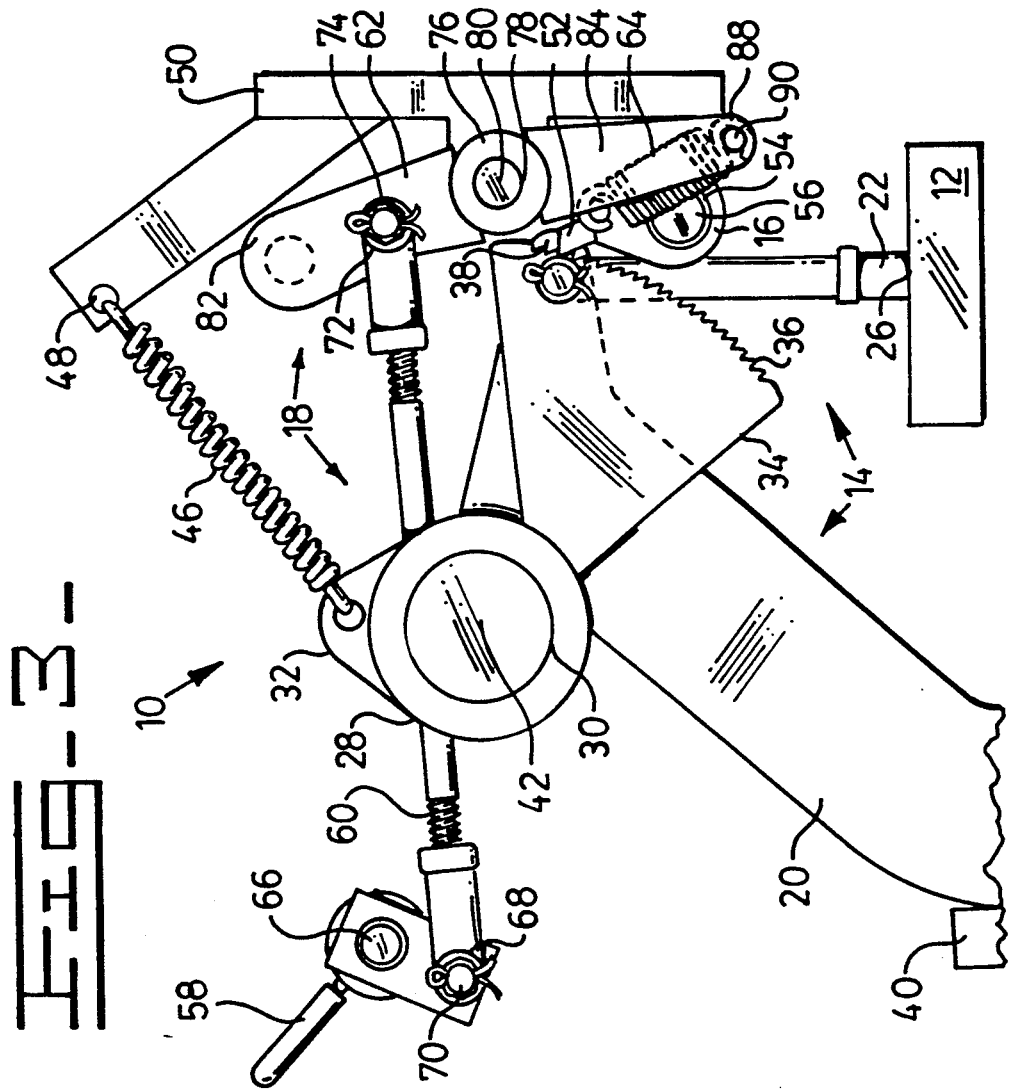
FIG. 3 is a diagrammatical right side view of the brake locking and release system shown in FIGS. 1 and 2 with the locking member actuating means in an unlocked position but the locking member not yet retracted.

FIG. 3 shows the locking member actuating means 18 again in the first position, except for the elastic member 64. The locking member 16 is still in interface with the ratcheted edge 36 of the tongue 34 of the first member 20 and the brake actuating means 14 is, in this Figure, in a slightly brake actuated position. A means is provided for exerting a force on the locking member 16 at the locking member's 16 second position urging the locking member 16 to return to the locking member's 16 first position. The means contacts the locking member 16 at least at the locking member's second position. In this case the means is the elastic member 64. In this position, the elastic member 64 is exerting a retraction force on the locking member 16, thus urging the locking member 16 to return to the locking member's 16 first position, but the locking member 16 is prevented from pivoting to the first position because of the frictional force between the locking member 16 and ratcheted edge 36. In order for the brake actuating means 14 to be unlocked, the operator simply applies slight additional pressure to the pedal actuated first lever 20 which slightly rotates the first lever 20 so that the locking member 16 can by the retractive force of the elastic member 64 rotate free of the ratcheted edge 36 and return to the first position. Then, the operator can manually operate the brakes 12 by continuing to apply pressure to the brake actuating means 14 or he can relieve the pressure whereupon the first tension coil spring 46 will pivot the first lever 20, subsequently returning the brake actuating means 14 to the brake-off position.

In the alternative embodiment of the brake locking and release system 10 shown in FIG. 6, the same principles are employed. However, in this case, the locking member 128 is brought into interface with the ratcheted top edge 130 of the slide bar 108 by manually pushing the handle 122 downward. The second tension coil spring 124 between the handle 122 and the locking member 128 is then in compression, which provides additional force to keep the locking member 128 in interface with the slide bar 108. However, the locking member 128 is still able to ride across and through the ratcheted top edge 130 of the slide bar 108 as the brake actuating means 94 is moved to progressively increasing brake actuated positions. When the external force is relieved from the brake actuating means 94, the first tension coil spring 120, which is in tension, attempts to return the slide bar 108 and subsequently the brake actuating means 94 to their brake-off position. However, the interface of the locking member 128 with the ratcheted top edge 130 of the slide bar 108 locks the brake actuating means 94 in place, thus maintaining the braking force. When the operator is ready to unlock the brake 104, he pulls the handle 122 into the up position, and then provides slight additional pressure to the pedal actuated first lever 98, to relieve the frictional force between the locking member 128 and the slide bar 108 thus allowing the locking member 128 to spring back to its first position. The operator can then release the external pressure from the brake actuating means 94 and the retraction force of the first tension coil spring 120 will return the brake actuating means 94 and subsequently the brake 104 to the brake-off position.

Other aspects, objects, and advantages of this invention can be obtained from a study of the drawings, the disclosure, and the appended claims.

I claim:

1. A brake locking and release system, comprising:
   a brake;
   a brake actuating means having a brake-off position and at least one brake actuated position, said brake actuating means being predisposed to said brake-off position;
   a locking member, said locking member having a first position at which said locking member is remote from said brake actuating means and said brake actuating means is free to return to said brake-off position and a second position at which said locking member interfaces with said brake actuating means at a brake actuated position and prevents said brake actuating means from returning to said brake-off position; and
   a locking member actuating means having a first position and a second position, comprising, an elastic member connected to said locking member, whereby at said second position of said locking member actuating means said locking member is at said locking member's second position and when said locking member actuating means is moved from said second position to said first position, said elastic member exerts a force on said locking member urging said locking member out of engagement with said brake actuating means at least until said locking member returns to said locking member's first position.

2. A brake locking and release system as claimed in claim 1, wherein said locking member actuating means comprises a locking lever, said elastic member having a first end connected to said locking lever and a second end connected to said locking member, whereby at said second position of said locking member actuating means said elastic member exerts a force on said locking member to hold said locking member in said locking member's second position.

3. A brake locking and release system as claimed in claim 2, wherein said elastic member is a spring.

4. A brake locking and release system as claimed in claim 2, wherein said brake actuating means further comprises a first lever and a linkage having a first end and a second end, said first end of said linkage being connected to said first lever and said second end of said linkage being connected to said brake, whereby movement of said first lever is translated through said linkage to said brake, creating a braking force.

5. A brake locking and release system as claimed in claim 4, said first lever having a ratcheted edge, said locking lever being pivotal between a first position and a second position and said locking member being pivotal between said locking member's said first and said second positions, wherein at said second position of said locking lever said locking member is at said second position interfacing with said ratcheted edge of said first lever and holding said brake actuating means in a said brake actuated position.

6. A brake locking and release system, comprising:
   a brake;
   a brake actuating means having a brake-off position and at least one brake actuated position, said brake actuating means being predisposed to said brake-off position;
   a locking member, said locking member having a first position at which said locking member is remote from said brake actuating means and said brake actuating means is free to return to said brake-off position and a second position at which said locking member interfaces with said brake actuating means at a brake actuated position and prevents said brake actuating means from returning to said brake-off position;
   a locking member actuating means connected to said locking member having a first position and a second position at which said locking member is at said locking member's second position, whereby said locking member actuating means may be returned from said second position to said first position without said locking member being returned from said locking member's second position to said locking member's first position; and
   a means being in contact with said locking member at least at said locking member's second position for exerting a force on said locking member urging said locking member out of engagement with said brake actuating means.

7. A brake locking and release system as claimed in claim 6, wherein when said locking member actuating means is at said second position and said locking member is at said second position and then said locking member actuating means is moved from said second position to said first position, said locking member remains in said locking member's second position due to a force between said locking member and said brake actuating means until the force between said locking member and said brake actuating means is relieved, whereupon said force of said means for exerting a force on said locking member returns said locking member to said locking member's first position.

8. A method of locking and releasing a brake system, said brake system having:
   a brake;
   a brake actuating means having a brake-off position and at least one brake actuated position, said brake actuating means being predisposed to said brake-off position;
   a locking member, said locking member having a first position at which said locking member is remote from said brake actuating means and said brake actuating means is free to return to said brake-off position and a second position at which said locking member interfaces with said brake actuating means at a brake actuated position and prevents said brake actuating means from returning to said brake-off position;
   a locking member actuating means connected to said locking member having a first position and a second position at which said locking member is at said locking member's second position; and a means for exerting a force on said locking member at said locking member's second position urging said locking member out of engagement with said brake actuating means;

said method comprising the steps of:

moving said brake actuating means from said brake-off position to one of said brake actuated positions;

moving said locking member actuating means from said first position to said second position thereby actuating said locking member from said first position to said second position in interface with said brake actuating means;

moving said locking member actuating means from said second position to said first position, wherein, however, said locking member remains at said second position interfaced with said brake actuating means; and further actuating said brake actuating means whereby said force exerting means moves said locking member out of engagement with said brake actuating means.

* * * * *